United States Patent
Riley (10) Patent No.: US 8,224,987 B2
(45) Date of Patent: Jul. 17, 2012

(54) SYSTEM AND METHOD FOR A HIERARCHICAL INTERCONNECT NETWORK

(75) Inventor: Dwight D. Riley, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2137 days.

(21) Appl. No.: 11/078,851

(22) Filed: Mar. 11, 2005

(65) Prior Publication Data
US 2005/0157700 A1 Jul. 21, 2005

Related U.S. Application Data

(63) Continuation-in-part of application No. 10/209,846, filed on Jul. 31, 2002, now Pat. No. 7,096,306.

(60) Provisional application No. 60/552,344, filed on Mar. 11, 2004.

(51) Int. Cl.
    G06F 15/173 (2006.01)
(52) U.S. Cl. .......... 709/238; 709/239; 709/242
(58) Field of Classification Search .......... 709/238, 709/239, 241, 252, 253; 370/254, 255, 351, 370/256, 257, 425; 710/305, 306, 313, 316
    See application file for complete search history.

(56) References Cited

U.S. PATENT DOCUMENTS

| | | | |
|---|---|---|---|
| 6,115,753 A * | 9/2000 | Joens ............. | 709/242 |
| 6,266,731 B1 | 7/2001 | Riley et al. | |
| 6,473,403 B1 * | 10/2002 | Bare ............. | 370/236 |
| 6,557,068 B2 | 4/2003 | Riley et al. | |
| 6,715,023 B1 * | 3/2004 | Abu-Lebdeh et al. ........ | 710/317 |
| 2001/0021177 A1 * | 9/2001 | Ishii ............. | 370/256 |
| 2003/0126299 A1 * | 7/2003 | Shah-Heydari ........ | 709/252 |
| 2004/0003162 A1 | 1/2004 | Chan et al. | |
| 2004/0024944 A1 | 2/2004 | Riley | |
| 2004/0221087 A1 * | 11/2004 | Benedetto et al. ........ | 710/316 |
| 2005/0038949 A1 * | 2/2005 | Patterson et al. ........ | 710/315 |

OTHER PUBLICATIONS

A. Kazmi, "Non-Transparent Bridging Makes PCI-Express HA Friendly," PLX Technology, Aug. 14, 2003, 6 pp. [Online] http://www.commsdesign.com/showArticle.jhtml?articleID=16501767.
P. Hochmuth, "Vendors Push Switch Standard," Network World, Feb. 2, 2004, 2 p. [Online] http://www.nwfusion.com/news/2004/0202infinterconnect.html.
A. Kazmi, "PCI Express and Non-Transparent Bridging Support High Availability," PLX Technology, Winter 2004, 8 pp. [Online] http://www.embedded-computing.com/articles/kazmi/content.shtml.
Jack Regula, "Using Non-transparent Bridging in PCI Express Systems," PLX Technology, Inc., Jun. 1, 2004, 31 p.

* cited by examiner

Primary Examiner — Kenny Lin
Assistant Examiner — Noel Beharry (57) ABSTRACT

A system and method for a hierarchical interconnect network. Some illustrative embodiments comprise a network switch comprising a plurality of ports each adapted to couple to other devices external to the network switch as part of an interconnect network (the interconnect network comprises an inverted tree structure that originates with a root bus), a controller coupled to the plurality of ports (the controller defines an active path through the network switch, the active path follows the inverted tree structure), and a memory coupled to the controller (the memory comprising routing information). The controller uses the routing information to identify an alternate path through the network switch. At least part of the alternate path does not follow the inverted tree structure.

3 Claims, 8 Drawing Sheets

SYSTEM AND METHOD FOR A HIERARCHICAL INTERCONNECT NETWORK

CROSS-REFERENCE TO A RELATED APPLICATION

The present application is a continuation-in-part of application Ser. No. 10/209,846, filed Jul. 31, 2002 now U.S. Pat. No. 7,096,306, and entitled "Distributed System with Cross-Connect Interconnect Transaction Aliasing," which is hereby incorporated by reference. The present application also claims priority to, and incorporates by reference, provisional application Ser. No. 60/552,344, filed Mar. 11, 2004, and entitled "Redundant Path PCI Network Hierarchy."

BACKGROUND

The development of microprocessor-based systems has resulted in the concurrent development of a variety of interconnect bus architectures for connecting microprocessors to other chips and devices within a system. Though initially such busses were implemented using parallel bus structures, serial bus structures have increasingly come into use to implement interconnect busses. This serialization of the interconnect busses has allowed existing networking technology to be used to create bus networks, sometimes referred to as "switch fabrics." These switch fabrics may interconnect multiple microprocessors, peripheral chips, interfaces and other devices, while still retaining the underlying bus architecture. By retaining the underlying architecture, the use of switch fabrics becomes transparent to the connected devices, and such devices can thus be used with little or no modification.

Some switch fabrics incorporate bus architectures that are based on a hierarchical or inverted tree structure. In such a structure, busses may be fanned out starting with a single "root" bus, which is then coupled to one or more secondary busses through one or more switches. Each secondary bus can also in turn be coupled to additional busses through additional switches, continuing on in a chain that is limited only by the underlying bus architecture. But within such a hierarchical structure a device at the end of one branch may not be able to communicate with a device at the end of another branch without the communication passing through the root bus. Further, a device coupled to the root bus may not be able to access a device at the end of a branch if one of the intervening switches fails.

BRIEF DESCRIPTION OF THE DRAWINGS

For a description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "software" refers to any executable code capable of running on a processor, regardless of the media used to store the software. Thus, code stored in non-volatile memory, and sometimes referred to as "embedded firmware," is within the definition of software. Further, the term "system" refers to a collection of two or more parts and may be used to refer to a computer or networking system or a portion of a computer or networking system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
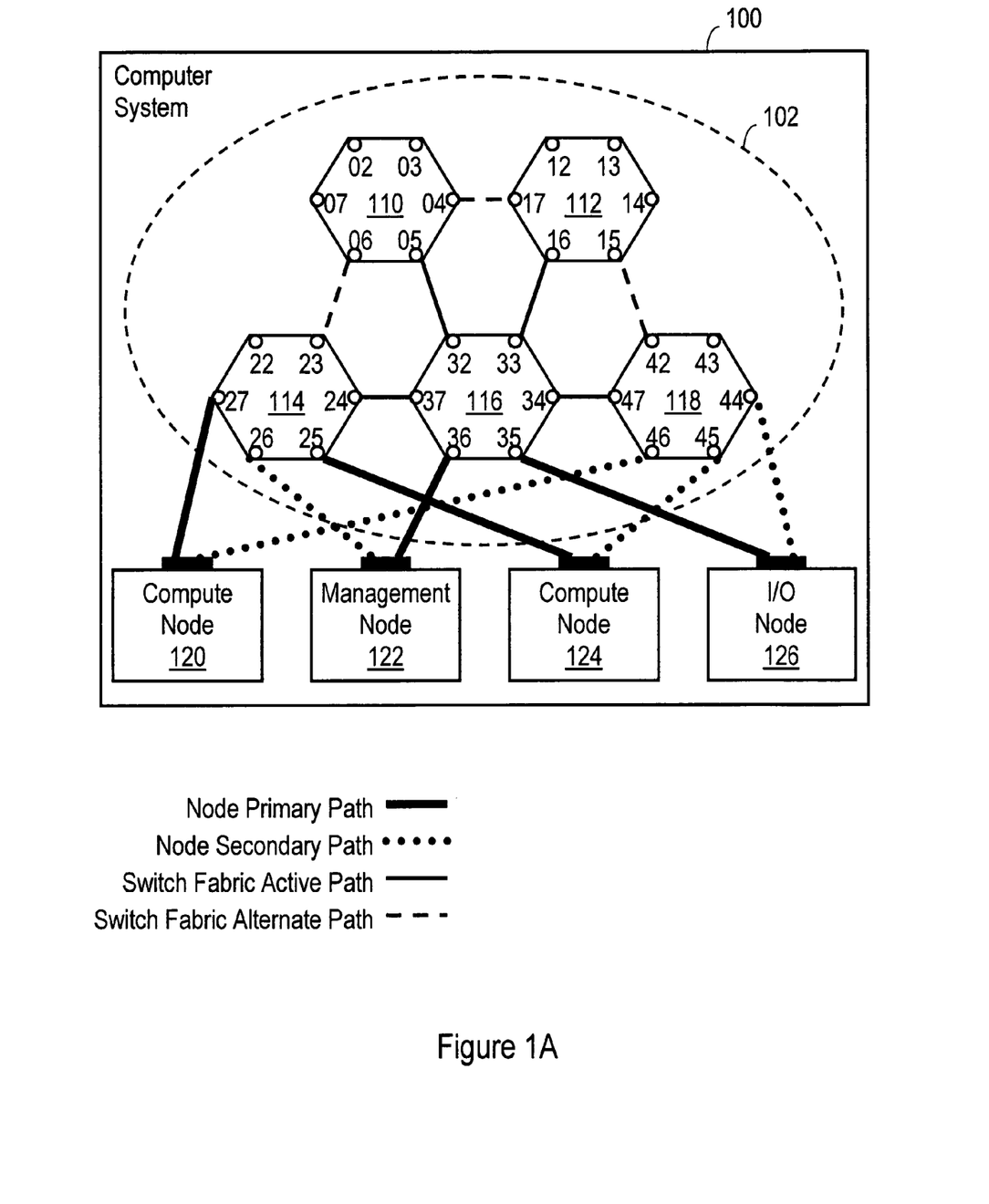
FIG. 1A shows a computer system constructed in accordance with at least some embodiments.

Interconnect busses have been increasingly extended to operate as network switch fabrics within scalable, high-availability computer systems. These computer systems may comprise several components or "nodes" that are interconnected by the switch fabric. The switch fabric may provide redundant or alternate paths that interconnect the nodes and allow them to exchange data. FIG. 1A illustrates a computer system 100 with a switch fabric 102 comprising switches 110 through 118 and constructed in accordance with at least some embodiments. The computer system 100 also comprises compute nodes 120 and 124, management node 122, and input/output (I/O) node 126.

Each of the nodes within the computer system 100 couples to at least two of the switches within the switch fabric. Thus, in the embodiment illustrated in FIG. 1A, compute node 120 couples to both port 27 of switch 114 and port 46 of switch 118; management node 122 couples to port 26 of switch 114 and port 36 of switch 116; compute node 124 couples to port 25 of switch 114 and port 45 of switch 118; and I/O node 126 couples to port 35 of switch 116 and port 44 of switch 118.

By providing both an active and alternate path a node may send and receive data across the switch fabric over either path based on such factors as switch availability, path latency, and network congestion. Thus, for example, if management node 122 needs to communicate with I/O node 126, but switch 116 has failed, the transaction may still be completed by using an alternate path through the remaining switches. One such path, for example, may be through switch 114 (ports 26 and 23), switch 110 (ports 06 and 04), switch 112 (ports 17 and 15), and switch 118 (ports 42 and 44).

Figure 1B:
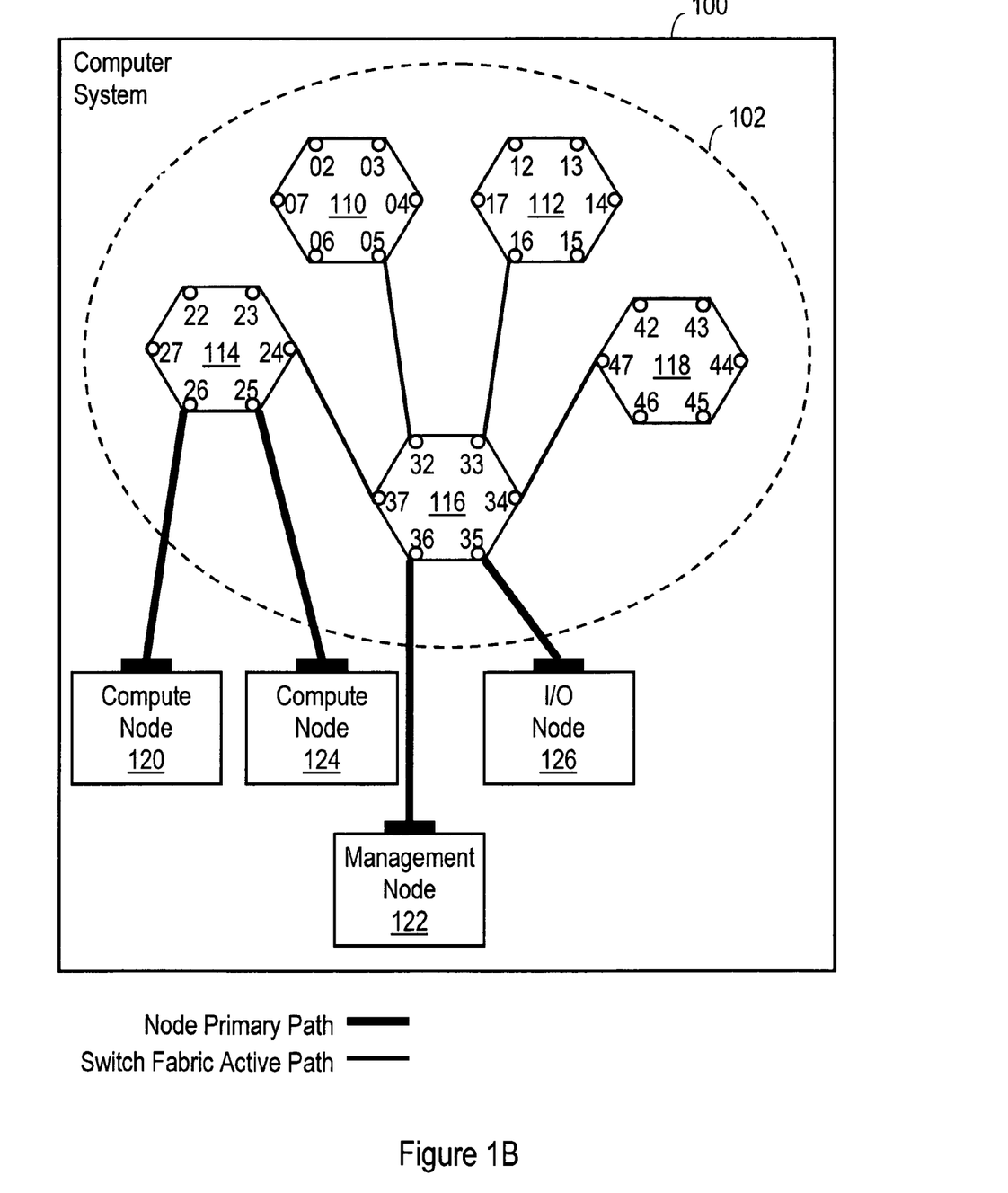
FIG. 1B shows the underlying hierarchical structure of a switch fabric within a computer system constructed in accordance with at least some embodiments.

Because the underlying hierarchical bus structure of the switch fabric 102, illustrated in FIG. 1B, does not support alternate paths as described, extensions to identify alternate paths may be provided to the process by which each node and switch port is mapped within the hierarchy upon initialization of the switch fabric 102. These extensions may be implemented within the switches so that hardware and software installed within the various nodes of the computer system 100, and already compatible with the underlying bus structure of the switch fabric 102, may be used in conjunction with the switch fabric 102 with little or no modification.

Figure 2:
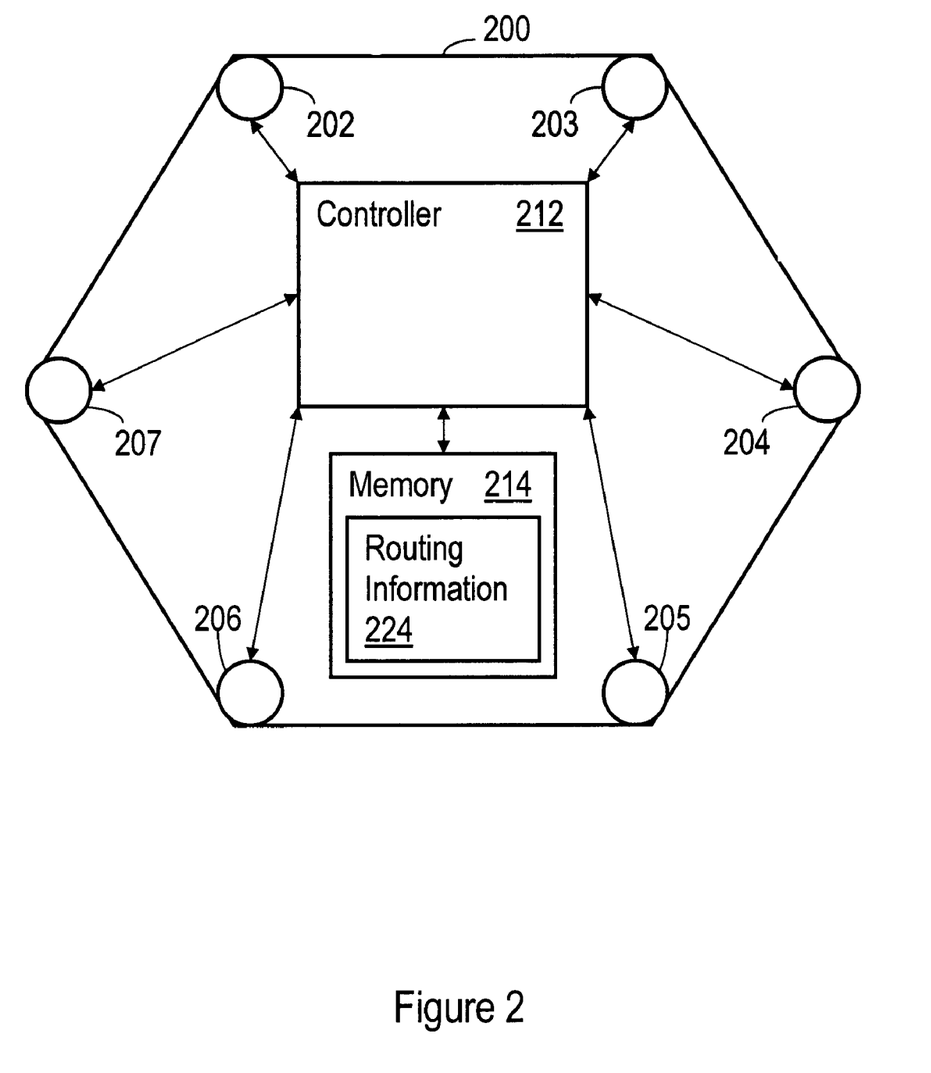
FIG. 2 shows a network switch constructed in accordance with at least some embodiments.

FIG. 2 illustrates a switch 200 implementing such extensions for use within a switch fabric, and constructed in accordance with at least some embodiments. The switch 200 comprises a controller 212 and memory 214, as well as a plurality of communication ports 202 through 207. The controller 212 couples to the memory 214 and each of the communication ports. The memory 214 comprises routing information 224. The controller 212 determines the routing information 224 upon initialization of the switch fabric and stores it in the memory 214. The controller 212 later uses the routing information 224 to identify alternate paths. The routing information 224 may comprise whether a port couples to an alternate path, and if it does couple to an alternate path, which endpoints within the computer system 100 are accessible through that alternate path.

In at least some embodiments the controller 212 may be implemented as a state machine that uses the routing information based on the availability of the active path. In other embodiments, the controller 212 may be implemented as a processor that executes software (not shown). In such an embodiment the switch 200 would be capable of using the routing information based on the availability of the active path, and would also be capable of making more complex routing decisions based on factors such as network path length, network traffic, and overall data transmission efficiency and performance. Other factors may become apparent to those skilled in the art, and such variations are intended to be within the scope of this disclosure.

Figure 3:
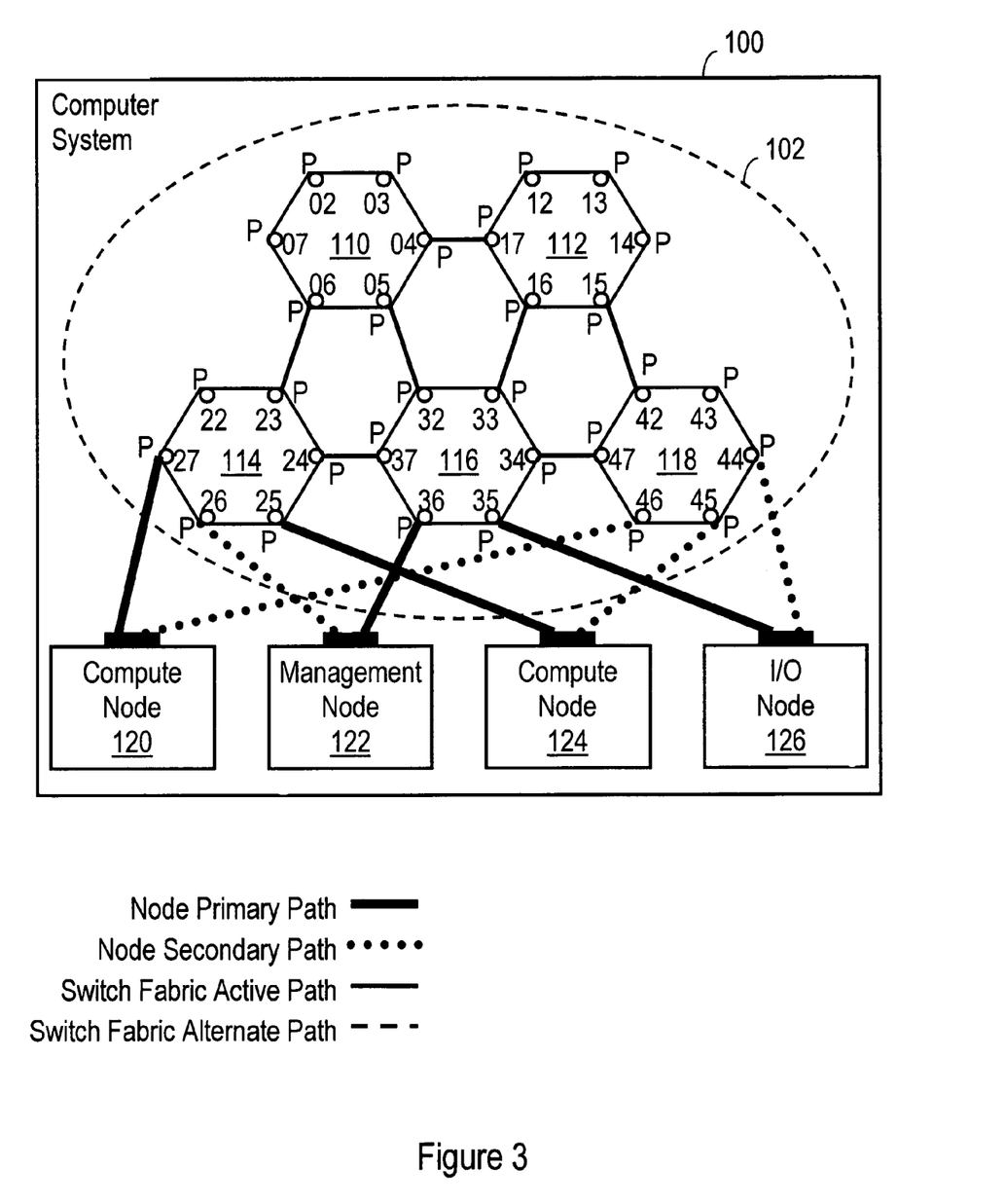
FIG. 3 shows the state of a computer system constructed in accordance with at least some embodiments after a reset.
Figure 4:
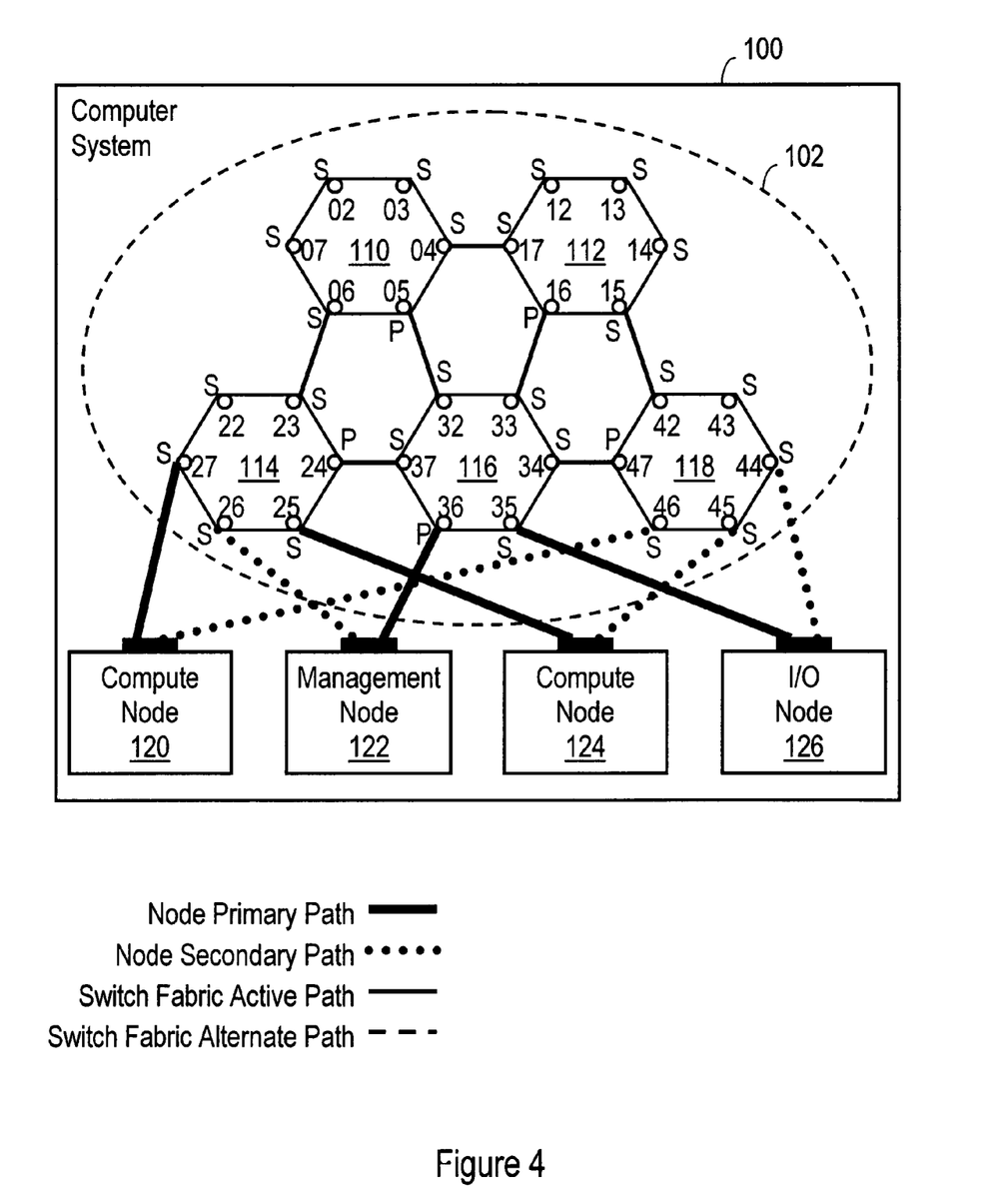
FIG. 4 shows the state of a computer system constructed in accordance with at least some embodiments after identifying the secondary ports.
Figure 5:
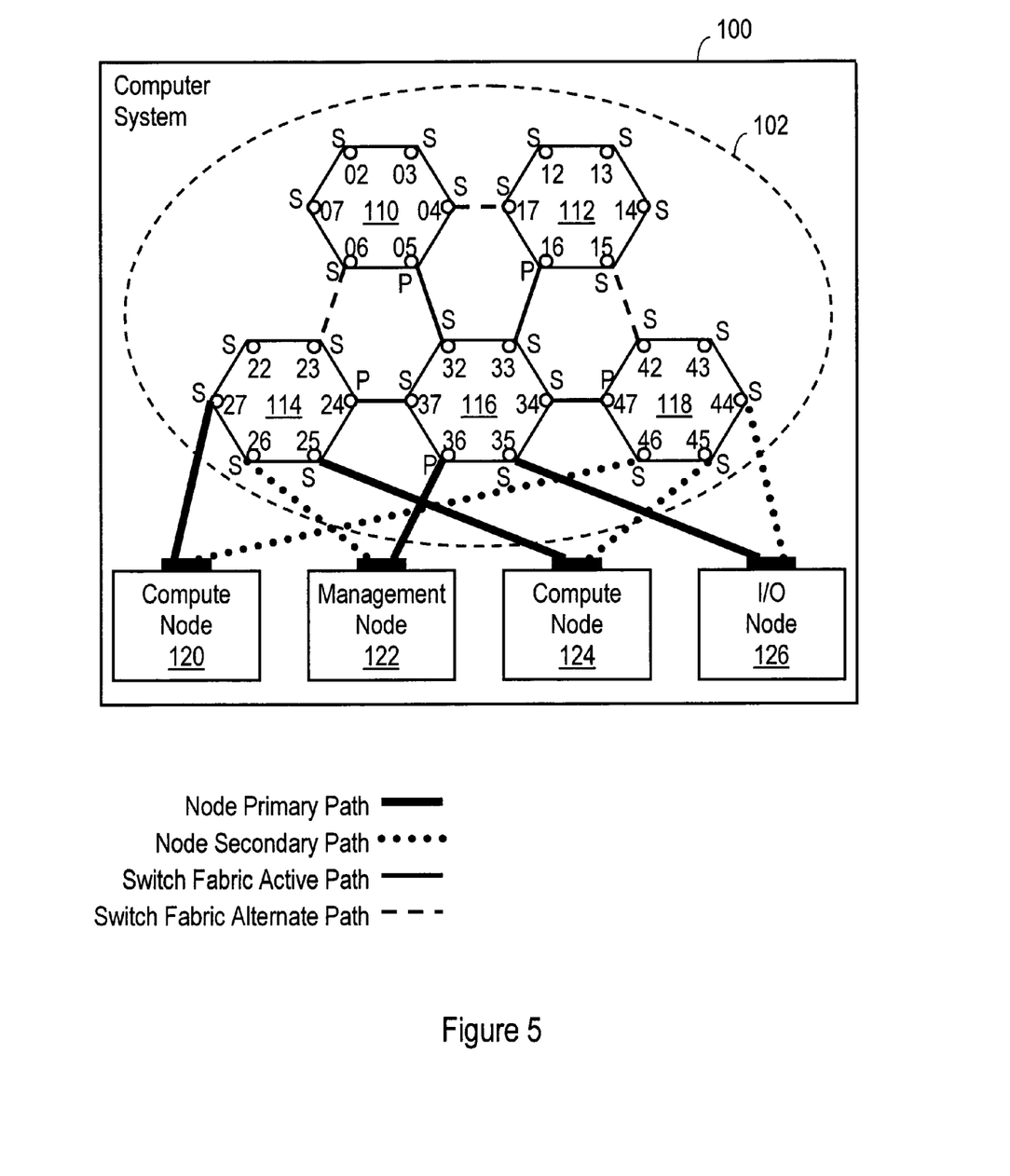
FIG. 5 shows the state of a computer system constructed in accordance with at least some embodiments after designating the alternate paths.

The initialization of the switch fabric may vary depending upon the underlying bus architecture. FIGS. 3 through 5 illustrate initialization of a switch fabric based upon a peripheral component interconnect (PCI) architecture and in accordance with at least some embodiments. Referring to FIG. 3, upon resetting the computer system 100, each of the switches 110 through 118 each identify their ports as primary ports (designated by a "P" in FIG. 3). Similarly, the paths between the switches are initially designated as active paths. The management node then begins a configuration cycle in which each switch port and endpoint within the hierarchy is identified (referred to in the PCI architecture as "enumeration"), and in which the primary bus coupled to the management node is designated as the root bus. The configuration cycle comprises accessing configuration data stored in the each device coupled to the switch fabric (e.g., the PCI configuration space of a PCI device). The switches comprise data related to devices that are coupled to the switch. If the configuration data regarding other devices stored by the switch is not complete, the management node may initiate additional configuration cycles until all devices coupled to the switch have been identified and the configuration data within the switch is complete.

Referring now to FIG. 4, when switch 116 detects that the management node 122 has initiated a first valid configuration cycle on the root bus, switch 116 identifies all ports not coupled to the root bus as secondary ports (designated by an "S" in FIG. 4). Subsequent valid configuration cycles may be propagated to each of the switches coupled to the secondary ports of switch 116, causing those switches to identify as secondary each of their ports not coupled to the switch propagating the configuration cycle (here switch 116). Thus, switch 116 will end up with port 36 identified as a primary port, and switches 110, 112, 114, and 118 with ports 05, 16, 24, and 47 identified as primary ports, respectively.

As ports are identified during each valid configuration cycle of the initialization process, each port reports its configuration (primary or secondary) to the port of any other switch to which it is coupled. Once both ports of two switches so coupled to each other have initialized, each switch determines whether or not both ports have been identified as secondary. If at least one port has not been identified as a secondary port, the path between them is designated as an active path within the bus hierarchy. If both ports have been identified as secondary ports, the path between them is designated as a redundant or alternate path. Routing information regarding other ports or endpoints accessible through each switch (segment numbers within the PCI architecture) is then exchanged between the two ports at either end of the path coupling the ports, and each port is then identified as an endpoint within the bus hierarchy. The result of this process is illustrated in FIG. 5, with the redundant or alternate paths shown by dashed lines between coupled secondary switch ports.

Figure 6:
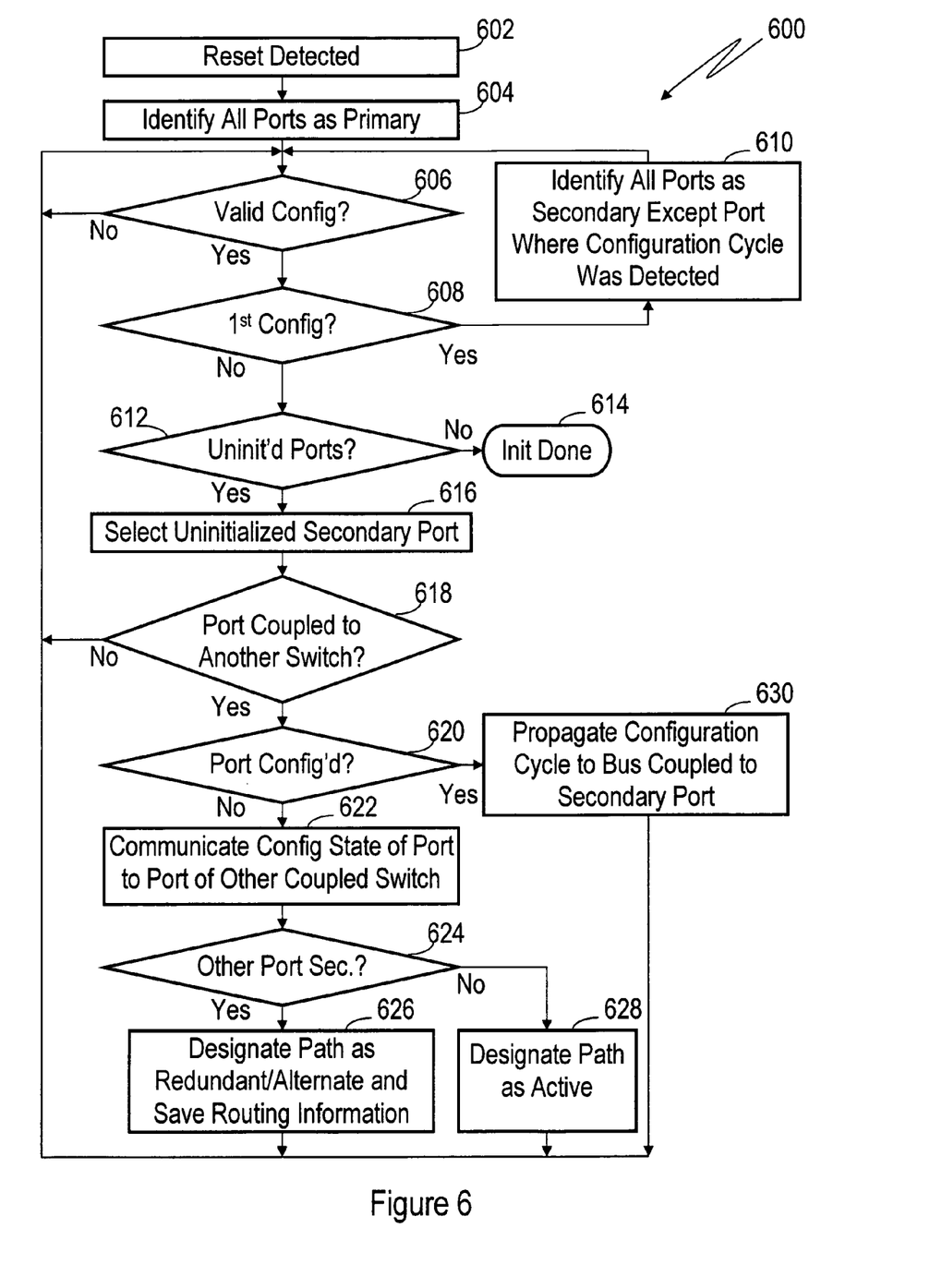
FIG. 6 shows an initialization method in accordance with at least some embodiments.

FIG. 6 illustrates initialization method 600 usable in a switch built in accordance with at least some embodiments. After the switch detects a reset in block 602 all the ports of the switch are identified as primary ports as shown in block 604. A wait state is entered in block 606 until the switch detects a valid configuration cycle. If the detected configuration cycle is the first valid configuration cycle (block 608), the switch identifies as secondary all ports other than the port on which the configuration cycle was detected, as shown in block 610.

After processing the first valid configuration cycle, subsequent valid configuration cycles may cause the switch to initialize the remaining uninitialized secondary ports on the switch. If no uninitialized secondary ports are found (block 612) the initialization method 600 is complete (block 614). If an uninitialized secondary port is identified (block 612) the identified secondary port is selected in block 616. If the selected secondary port is not coupled to another switch (block 618), no further action on the selected secondary port is required (the selected secondary port is initialized).

If the secondary port selected in block 616 is coupled to another switch (block 618) and the selected secondary port has not yet been configured (block 620), the selected secondary port communicates its configuration state to the port of the other switch to which it couples (block 622). If the port of the other switch is also a secondary port (block 624) the path between the two ports is designated as a redundant or alternate path and routing information associated with the path is saved (block 626). If the port of the other switch is not a secondary port (block 624) the path between the two ports is designated as an active path (block 628). After configuring the path as either active or redundant/alternate, the port is configured and the process is repeated by again waiting for a valid configuration cycle in block 606.

If the port is found to have already been configured in block 620, the valid configuration cycle is propagated to all appropriate busses coupled to the selected secondary port. This may include a first bus coupled to the port selected in block 616, as well as additional busses coupled to other switches that also couple to the selected switch through the first bus. When all ports on all switches coupled to the selected secondary port have been configured, the port is initialized. Multiple configuration cycles may be needed to complete the initialization of the selected secondary port. After the selected secondary port has been initialized, the process is again repeated for subsequent uninitialized ports until all secondary ports within the switch have been initialized.

Once the initialization process has completed and the computer system begins operation, data packets may be routed as needed through alternate paths identified during initialization. For example, referring again to FIG. 5, when a data packet is sent by management node 122 to I/O node 126, it is routed from port 36 to port 34 of switch 116. But if switch 116 were to fail, management node 122 would then attempt to send its data packet through switch 114 (via the node's secondary path to that switch). Without switch 116, however there is no remaining active path available and an alternate path must be used. When the data packet reaches switch 114, the extended information stored in the switch indicates that port 23 is coupled to a switch that is part of an alternate path leading to I/O node 126. The data packet is then routed to port 23 and forwarded to switch 110. Each intervening switch then repeats the routing process until the data packet reaches its destination.

Figure 7:
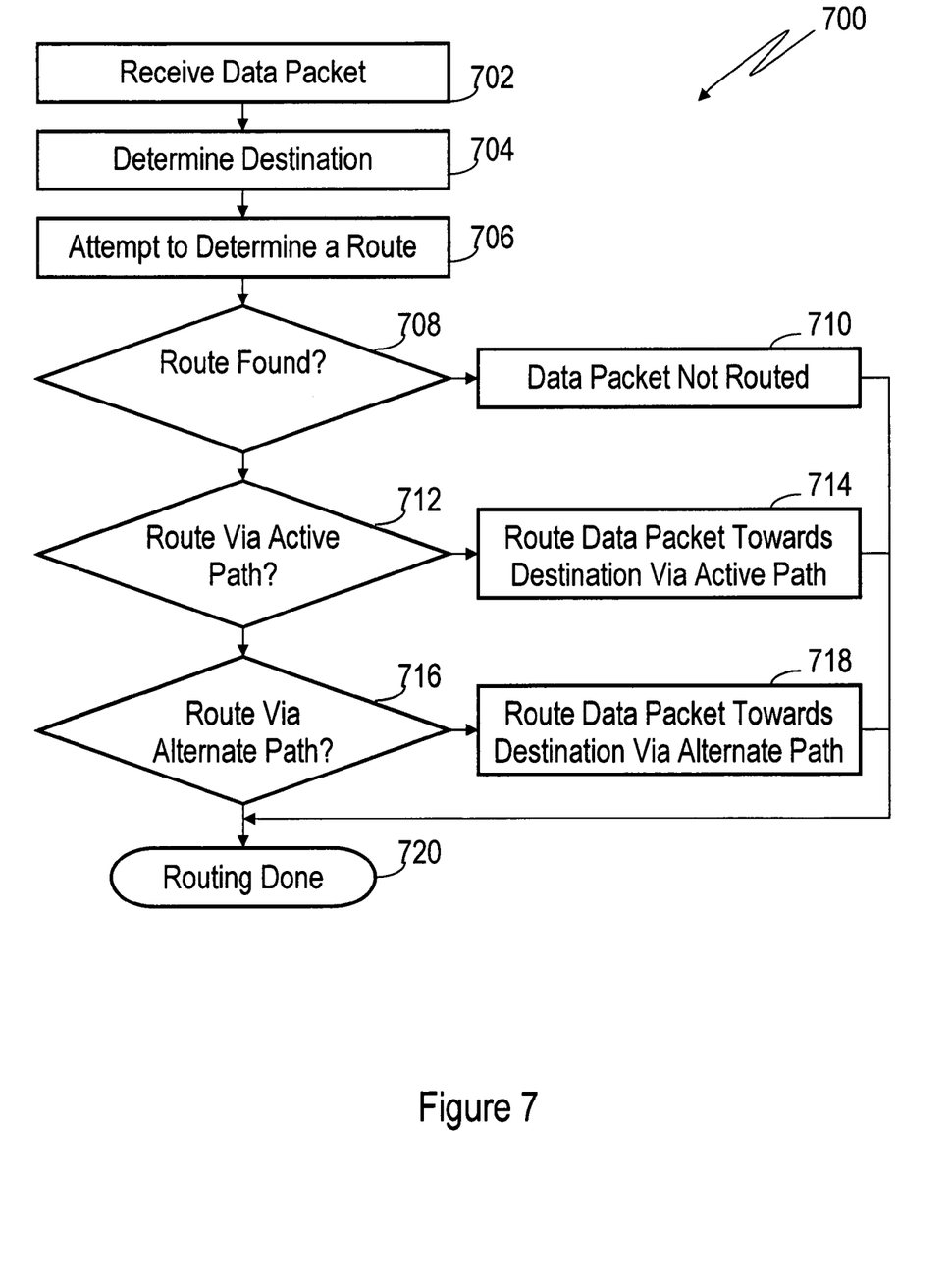
FIG. 7 shows a routing method in accordance with at least some embodiments.

FIG. 7 illustrates routing method 700 usable in a switch built in accordance with at least some embodiments. The switch receives a data packet in block 702, and determines the destination of the data packet in block 704. This determination may be made comparing routing information stored in the switch with the destination of the data packet. The routing information may describe which busses and devices are accessible through a particular port (e.g., segment numbers within the PCI bus architecture). Based on the destination, the switch attempts to determine a route to the destination through the switch (block 706). If a route is not found (block 708), the data packet is not routed (block 710). If a route is found (block 708) and the determined route is through an active path (block 712), then the data packet is routed towards the destination through the identified active path (block 714). If a route is found and the determined route is through an alternate path (block 716), then the data packet is routed towards the destination through the identified alternate path (block 718). After determining the path of the route (if any) and routing the data packet (if possible), routing is complete (block 720).

The above discussion is meant to be illustrative of the principles and various embodiments of the present invention. Numerous variations and modifications will become apparent to those skilled in the art once the above disclosure is fully appreciated. For example, although some of the embodiments are described in the context of a PCI bus architecture, other similar bus architectures may also be used (e.g., Hyper-Transport, Rapid IO, Serial Attached SCSI, and Serial ATA). It is intended that the following claims be interpreted to embrace all such variations and modifications.

What is claimed is:

1. A system, comprising:
   a means for executing user application software;
   a means for interfacing to peripheral devices; and
   a means for transferring data coupled to the means for executing and the means for interfacing, the means for transferring comprises an inverted tree structure, and also comprises an active and an alternate data communication path between the means for executing and the means for interfacing;
   wherein the structure of the active path through the means for transferring is a subset of the inverted tree structure; and
   wherein the structure of the alternate path through the means for transferring is not a subset of the inverted tree structure.

2. The system of claim 1, wherein the means for transferring further routes packets between the means for executing and the means for interfacing through the alternate data communication path when the active data communication path fails.

3. The system of claim 1, wherein the means for transferring further routes packets between the means for processing and the means for interfacing through the alternate data communication path when the alternate data communication path provides higher communication efficiency than the active data communication path.

* * * * *